Oct. 11, 1927.
W. B. S. WHALEY
1,645,169
METHOD AND MEANS FOR OPERATING CONSTANT PRESSURE INTERNAL COMBUSTION ENGINES
Filed Jan. 3, 1922  5 Sheets-Sheet 3
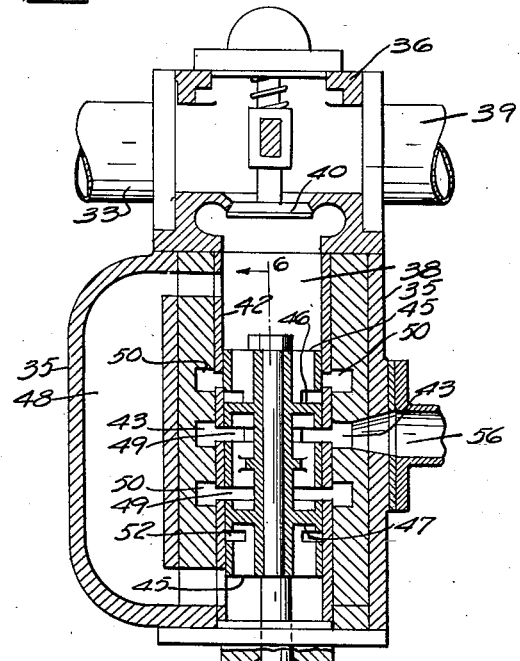
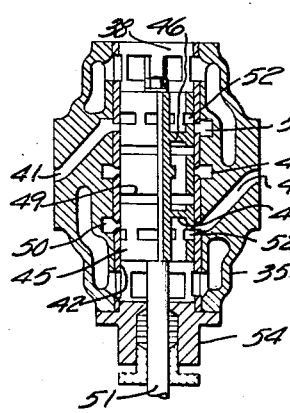
INVENTOR
William B Smith Whaley
BY
George H Benjamin
ATTORNEY

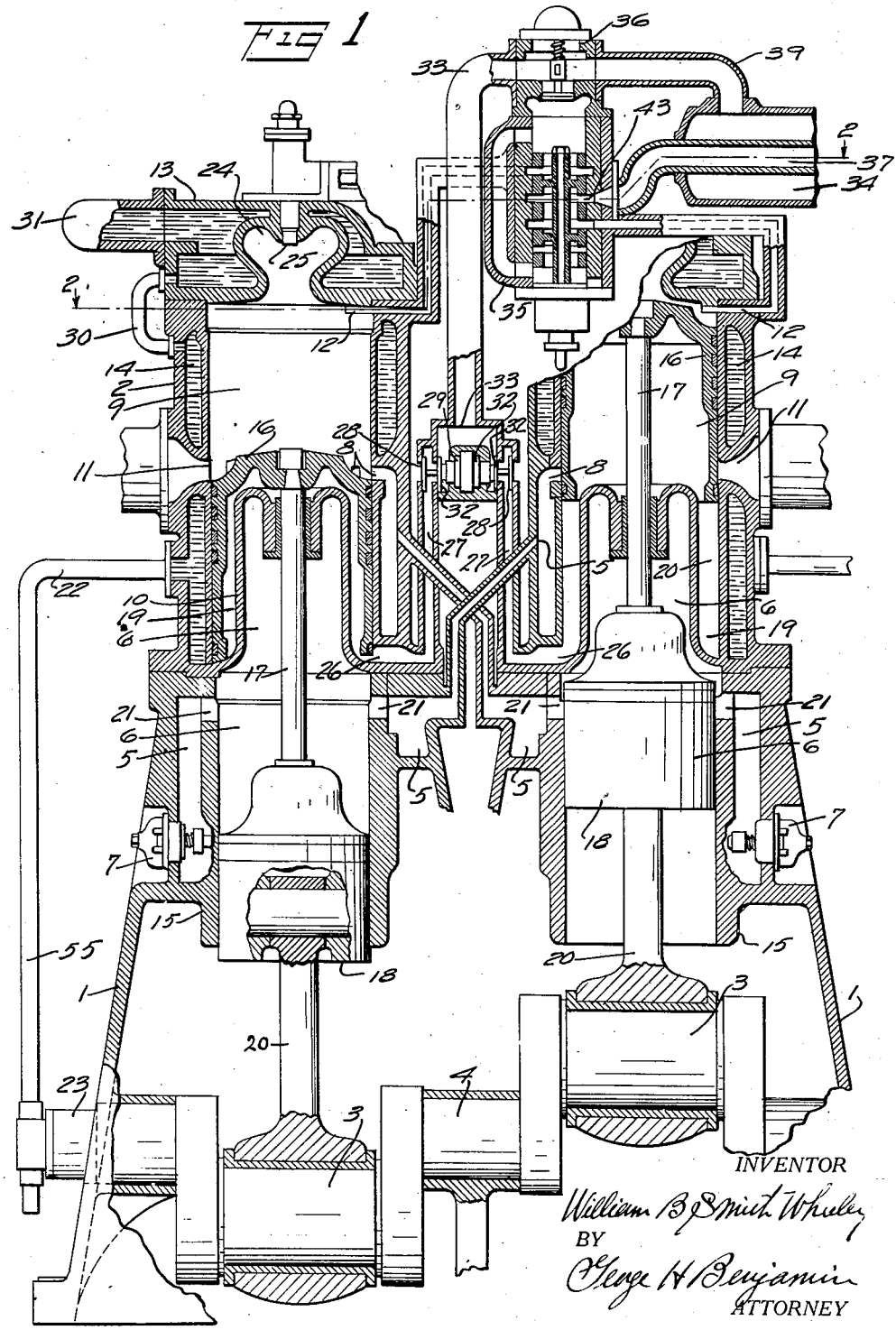

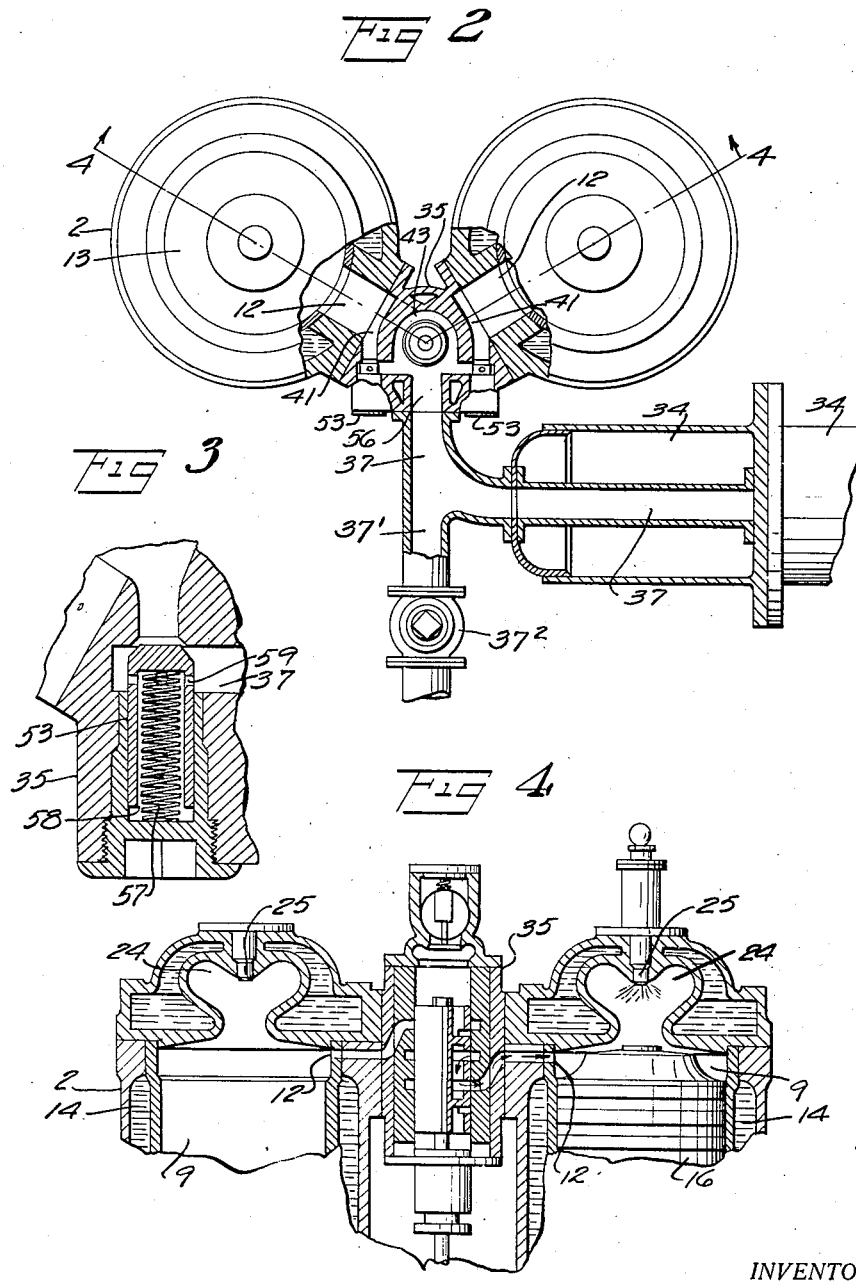

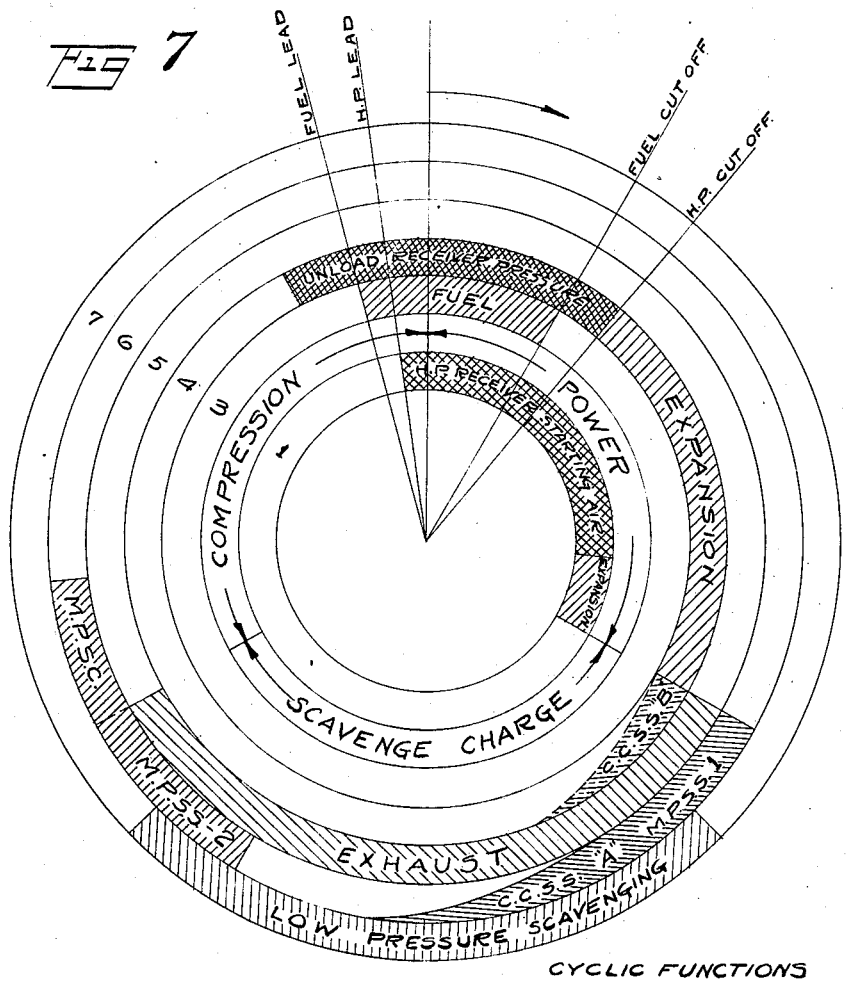

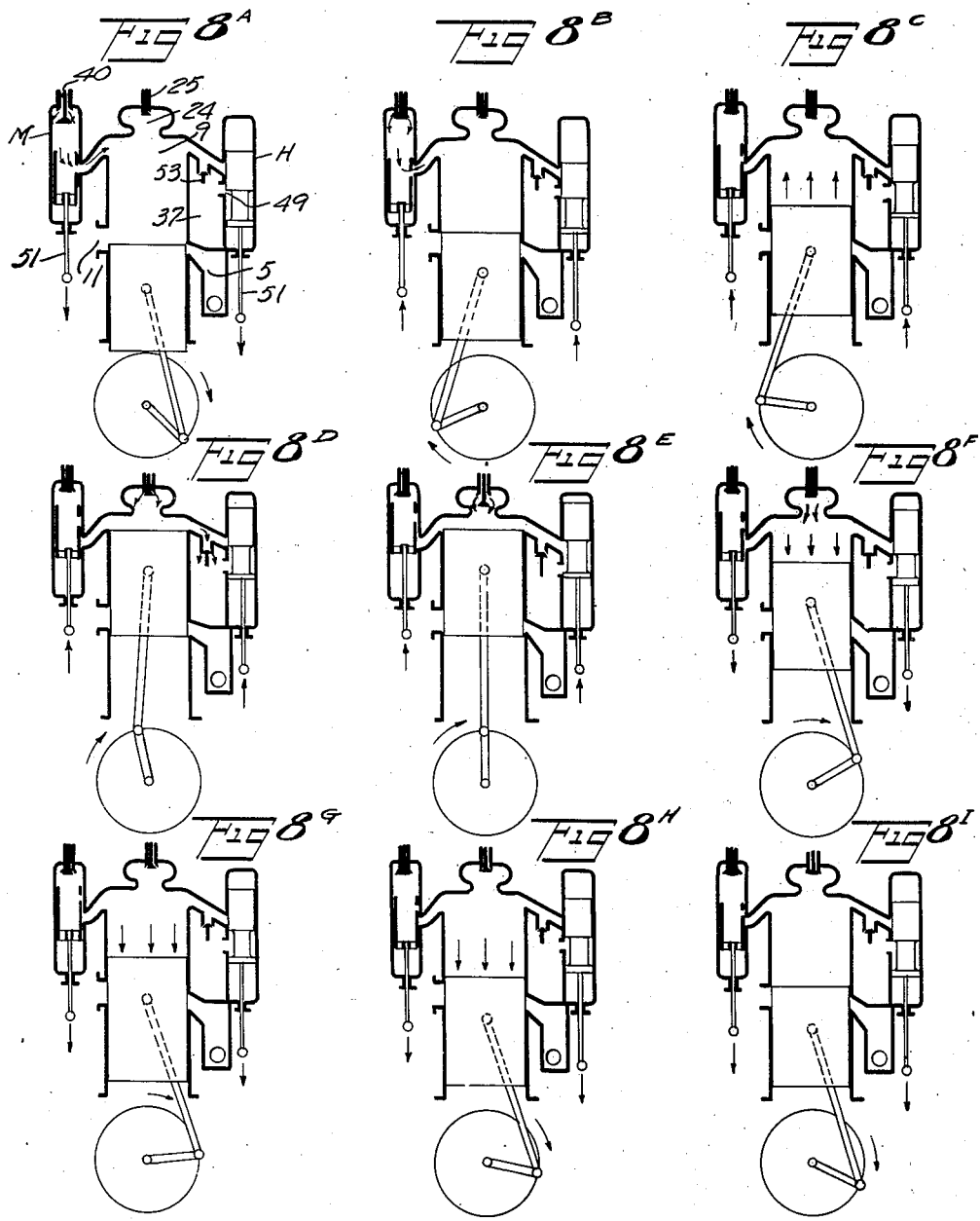

Patented Oct. 11, 1927.

1,645,169

UNITED STATES PATENT OFFICE.

WILLIAM B. SMITH WHALEY, OF NEW YORK, N. Y., ASSIGNOR TO WHALEY ENGINE PATENTS, INC., A CORPORATION OF DELAWARE.

METHOD AND MEANS FOR OPERATING CONSTANT-PRESSURE INTERNAL-COMBUSTION ENGINES.

Application filed January 3, 1922. Serial No. 526,727.

My invention relates to internal combustion engines, and has for its object to provide a means for operating gas or oil engines, and a method of operating such engines, more especially oil engines of the so-called solid injection types, and of the two stroke constant pressure cycle types.

My engine embodies features which eliminate the objectionable and troublesome characteristics incident to the present day engines.

One object of my invention is to devise an internal combustion engine, which operates on a cycle which provides a reliable, efficient and commercial engine, having flexibility of control. The cycle of operation of my engine is applicable to any size or output of engine, and is suitable for all classes and kinds of work, such as stationary, marine, automotive, locomotive, etc.

Another object of my invention is to charge the cylinder of the engine on the compression stroke, with additional air used for compression, thereby increasing the output of the engine of a given piston displacement. This additional air which is compressed to higher pressure than the low pressure scavenging air has therefore, a higher temperature than would otherwise be the case, and the heat of which tends to raise the initial temperature of compression of the engine cylinder. This feature enables me to reach a higher final temperature of compression, than would otherwise be possible, without excessive pressure.

Another object of my invention is to prevent the formation of abnormally high and dangerous pressures, during the compression stroke, or during the combustion period of the engine, thereby doing away with the dangers attending the high pressure oscillations that are set up in the engine during combustion, and enabling me to make a much lighter engine for a given horse power.

Another object of my invention is to provide a means of thoroughly scavenging the cylinder, upon the completion of the expansion stroke.

Other objects and advantages of my invention will be gathered from the description.

In the drawings, I have illustrated an engine of the stationary type. It is understood that I do not confine myself to any particular type of engine, this being only one embodiment of my invention.

Referring to the drawings:

Fig. 1 is an elevation of the front of my engine mostly in section.

Fig. 2 is a view, taken substantially on lines 2—2, Fig. 1, partly in section.

Fig. 3 is an enlarged sectional part view of Fig. 2, showing the valve 53 in Fig. 2 in its open position.

Fig. 4 is a sectional view taken substantially on line 4—4, Fig. 2.

Fig. 5 is an enlarged sectional view of the air controlling valve of my engine.

Figs. $5^a$ and $5^b$ illustrate a method of obtaining adjustable variable control of the air valve 35.

Fig. 6 is a sectional view of Fig. 5 on lines 6—6.

Figs. 7 and 8 are diagrams showing the various functions of the cycle of operation of my invention as applied to a two stroke internal combustion engine. The different positions in Fig. 8 are designated by adding letters $a$, $b$, $c$, $d$, $e$, $f$, $g$, $h$ and $l$.

For the purpose of illustrating my invention, I have shown a vertical twin cylinder engine with opposite cranks and for convenience of reference, and simplicity, I have associated the parts of the two cylinders by numbering them, similarly.

The engine which I have shown in the drawings may be of the open crank case type, supporting two cylinder casings and other working parts, as will be more fully described hereinafter. The crank case, 1, has integrally formed thereon two cylindrically formed cross head guides, 15. Immediately above the cross head guide, 15, is mounted a cylinder, 2, the cylinder being concentric and in alignment with the cross head guide, 15. Above the cylinder is mounted the combustion chamber, 24, assembled concentrically with the longitudinal axis of the cylinder, 2. In the center of the combustion chamber, 24, and at its upper portion, is mounted the oil fuel valve, 25. Mounted in the cylinder, 2, is a hollow piston, 16, provided with the usual rings on the periphery thereof, and having an enclosed upper end. The piston, 16, is secured at its upper end to, and driven by, the piston rod, 17, The latter has secured thereto the cross head, 18, so that the piston, 16, the piston rod, 17, the cross head, 18, are secured and operated together as a unit.

The cross head, 18, moves in, and is guided by the cross head guide, 15. Between the piston, 16, and the cross head, 18, I provide a stationary displacer, 10, secured to or integrally part of, the cylinder, 2, and of approximately the form shown in Fig. 1. The lower flange of the displacer, 10, extends upwardly, forming a tube, with its longitudinal axis co-incident with the longitudinal axis of the cylinder, 2, and at its upper end, this tube is reflexed downwardly, toward the center of the cylinder, and terminates, as shown, in a bearing for the piston rod, 17. This displacer is adapted to substantially fill the hollow space of the piston, 16, when the same is in its lowest position.

The upper part of the cross head, 18, is dome shaped, and adapted to partly fill the space contained within the tubular portion, of the displacer, 10, when the same is in its highest position. To the cross head, 18, I pivot a connecting rod, 20, at its upper end. The lower end of the two cranks, 3—3 are located 180 degrees apart, on a common shaft, 4, provided with suitable bearings. Around the cross head, guide, 15, I provide an air receiver, 5, connected at its upper end through duct 21, to the clearance 6, between the displacer, 10, and the cross head, 18, and provided at its lower end with an outside air inlet spring pressed disc valve, 7.

On one side of the receiver, 5, I provide an air duct, extending upwardly and diagonally across to a low pressure receiver, 8, of the opposite cylinder of the engine. The low pressure receiver, 8, is connected to the cylinder, 9, for scavenging purposes. The port to receiver, 8, is opened and closed by the reciprocating motion of the piston, 16, as will hereinafter be more fully shown.

Between the displacer, 10, and the piston, 16, I provide a clearance, 19, which is connected by means of a duct, 26, to a duct, 27. The duct, 27, runs to a spring pressed disc valve, 32, which controls the communication between the duct, 27, and a duct, 33, the latter running to a medium pressure air receiver, 34. I also provide a spring pressed valve, 28, which controls communication between duct 27, and the outside air. Valves 28 and 32 operate independent of each other, and are provided with separate springs in the space, 29. Above the piston, 16, and diametrically opposite to the scavenging air intake, I provide an exhaust port, 11. The lower edge of the scavenging port, 8, and the exhaust port, 11 are in this case on a line with each other, and with the upper outer edge of the piston, 16, in its lowest position. At the upper end of the cylinder, 2, I provide an air intake duct, 12, which communicates with the air control valve, 35. At the upper end of the cylinder, 2, I have a head, 13, provided at its center with the combustion chamber, 24. The latter extends upwardly in a longitudinal direction; and the upper diameter of the combustion chamber, 24, is greater than the diameter of its opening to the top of the cylinder, 2. The top of the combustion chamber, 24, is depressed concentrically with the chamber, and with the cylinder, 2. At the center of, and at the lowest point in, this depression, I insert a fuel oil valve, 25, as will be described hereinafter.

Around the major portion of the cylinder, 2, and the combustion chamber, 24, I provide water jackets, 14. Inasmuch as the cylinder, 2, and the head of the cylinder, 13, are separate parts, I provide a pipe, 30, as a communication between these two parts of the water jacket. At or near the lower part of the water jacket, 14, of the cylinder, 2, I provide a tubular connection, 22 and 55, communicating with a suitably driven water pump, 23. At the upper part of the cylinder head, 13, I provide an outlet tube connection, 31, whereby the water may be disposed of in the usual manner.

Referring now to the air control valve, 35, Figs. 5-6, the valve is of a cylindrical reciprocating type, and consists principally of a stationary cylindrical sleeve, 42, and its parts, into which is mounted a piston, 45, secured to a rod, 51, reciprocated vertically with, an adjustable and variable control. One method of accomplishing this movement of the valve 35 is shown in Figs. 5ª and 5ᵇ, wherein the rod, 51, to which the valve 35 is secured, is reciprocated by a link, 60, pivoted thereto and also to the end of a pivoted lever, 61. The lever has a fixed bearing, 62, upon which it oscillates, being actuated by a rod, 63, connected to a strap of an eccentric, (not shown), driven by the engine. The lever, 61, is provided with a sliding bearing, 64, upon which a block moves that comprises a bearing, 65, for the upper end of the rod, 63. The block is moved by a link, 66, secured thereto and also to the end of a crank, 67, having a fixed bearing, 68. By moving the crank in to different positions, the position of the block is changed, and an adjustable and variable control of valve 35 is obtained to permit adjustment of the stroke of the valve for different speeds or other conditions of operation. In case products of combustion have a tendency to flow into receiver 37 through excessive fuel injection and a resulting tendency to excessive pressure in the cylinder, it is desirable to lengthen the cut off of the valve to close it at a later time and thereby permit return of such products of combustion to the cylinder when the pressure in the cylinder begins to fall. The mechanism referred to permits such adjustment of the valve 35. This motion occurs equally each side of a high pressure port, 43, constituting the center of the sleeve, 42. The sleeve, 42, in which the piston reciprocates, is made separate from its supporting frame, 35, for reasons of facility to manufacture, and is supplied with a duct, 48, forming a communication between the clearance above and below the piston, 45. The piston, 45 comprises a central tubular portion through which the rod, 51, passes and whereon the piston, 45, is secured, and a larger tubular portion fitting inside the sleeve, 42. Between the center tubular portion and the larger tubular portion is provided two flanges, 46 and 47. These flanges are spaced equally distant from the center of the piston, 45, and form a space between them, for the purpose to be described hereafter.

The piston, 45, is provided with four lateral lines of ports, spaced along its length, forming communications from one side to the other of the outside tube of the piston.

The two extreme lines of ports, 52, are continuously in communication with the clearances of the piston, 45, and the passage 48.

Between flanges, 46 and 47, I provide two additional ports, 49—49, in the piston, 45, spaced equally distant from a center point in the piston, and arranged to open and close ports 50—50. The ports, 52—52, connect the ports, 50—50 alternately with the clearance, 48, of the cylinder. The port, 43, is connected to the high pressure equalizer, 37, Fig. 1. The lower port, 50, is connected by means of duct 41, Fig. 6, to the top of the right cylinder, 9, through duct 12 The upper port, 50, is connected through a similar duct, 41, Fig. 6, to the left cylinder, 9, through port, 12. The piston, 45, is provided with suitable rings, not shown, operating between it and the sleeve, 42, to prevent a loss of pressure, as will be readily understood. The cylinder of this valve, 35, may be constructed in any well known manner, but I prefer to make the sleeve, 42, in which the piston, 45, reciprocates, removable, for the purpose of taking care of wear, and also for the purpose of changing the timing of the opening of the ports, if desired.

The lower end of the valve cylinder, 35, is provided with a stuffing box, 54, through which the piston rod, 51, reciprocates. The upper end of the valve cylinder, 35, is provided with a valve chamber, 36, between which is mounted a spring pressed poppet valve 40, which controls the communication between the upper clearance, 38, of the valve, 35, and the valve chamber, 36. The valve chamber, 36, is in communication with the medium air pressure receiver, 34, Fig. 1, through a pipe connection, 39, and is also in communication with the medium pressure poppet valve, 32—32, through pipe connection, 33 so that air compressed between the displacer 10 and the piston 16 may pass through said connections 33 and 39 into the receiver 34 to charge the latter. The receiver 37 may be charged from any suitable source, such as a compressor (not shown) through conduit 37' (Fig. 2). The opening or closing of this conduit may be controlled by a valve 37².

Referring to the mechanism for injecting oil into the combustion chamber of the engine: I would state that while any well-known system of injection or fuel valve may be used, yet I would prefer to use the method more specifically disclosed in my application for U. S. Patent, Serial No. 462,053, filed April 18, 1921, entitled, Apparatus for supplying liquid fuel to internal combustion engines.

Referring to the method of starting: Attention is called to the fact that the air controlling valve, 35, is so timed in its movements to the positions of the diametrically positioned pistons, 16—16, that high pressure air may be allowed to enter above the pistons as they reach the top center, and continue for a portion of the downward stroke of the piston, until the engine is started.

Referring to the feature of cushioning the piston, at the end of its compression, and during its combustion, stroke, in Figs. 2 and 3, I show the passages, 12—12, communicating with a connection, 56, communicating with a high pressure equalizer, 37. This communication is partly controlled by spring pressed "unloader" valves, 53. These valves, 53, Fig. 3, are provided with a central longitudinal recess, 58, in which I mount a spring 57, for the purpose of holding the valve on its seat. These valves are maintained seated when the pressures in the cylinders, 2—2, are below the pressure in the equalizer, 37, by means of the pressure in the equalizer, 37, and are only unseated at such times as the pressures in the cylinders 2—2 may become greater than the pressure in the equalizer, 37. To insure the reseating of the valves, 53—53, I prefer to have them spring pressed, as shown, especially as they may be operated in a longitudinal or vertical position.

Referring to the operation of the engine: Attention is called to Figs. 7 and 8, and more especially to the latter, wherein the parts of the engine are shown in different positions, corresponding to various positions of the crank and wherein, to prevent confusion of parts, the valve, 35, has been replaced by two separate valves, M, adapted to control the medium pressure air supply, and H, adapted to control the high pressure air supply. These two valves act as a single valve, and perform the same functions as the valve, 35. The parts of the engine shown in Fig. 8 are indicated by the same numbers as in the previous figures, for convenient reference. In diagrams, Fig. 8, *a*, *b*, *c*, etc., the two individual valves, M. and H. are operated simultaneously by a common driving shaft, in the same direction, and to the same degree, the same as if they were one valve, such as disclosed in the specification above. Fig. 8, a, b, c, etc., show nine positions of the parts of my engine, corresponding to nine positions in my cycle of operation. I appreciate there may be a number of variations made by one skilled in this art, in the operation as shown, and therefore, do not limit myself to the precise details, as shown in Figs. 7 and 8. The crank is considered to move clockwise, in Fig. 8.

In Fig. 7 I have shown a diagram which gives the angular loci of the various functions of the elements of my invention. This diagram shows the position of the engine crank, at the beginning and end of each function, and therefore the relation of one function to another. This will be more clearly brought out hereinafter by associating the letter designated radial lines, (which correspond with certain positions of the engine crank), with the correspondingly lettered positions of the engine crank in Fig. 8, and reading the following description of Fig. 8, as applying also to Fig. 7.

In Fig. 7 I have given the elements of my invention in circular zones, as shown, so that each element has its individual zone. The zone marked 1 shows the time of starting and stopping, and duration of the flow of air, during the starting up of the engine.

The zone next to zone 1 shows the position of the engine crank at the beginning and end of the power, scavenging and compression stroke.

The zone marked 3 shows the position of the engine crank during the feeding of fuel to the engine.

The zone marked 4 shows the time during the revolution of the crank at which the receiver, 37, Fig. 8 a comes into action.

The line H indicates the time the pressure relief valve, 53, is liable to open an abnormal pressure in the cylinder. This zone also shows the expansion angle after the high pressure receiver, 37, has been cut off and the final scavenging at the end of the power stroke, after the exhaust opens.

The zone marked 5 shows the exhaust angle or scavenging period.

The zone marked 6 shows the operation of the medium pressure air as controlled by the piston valves M, Fig. 8. It is seen that this valve opens twice per cycle, first at the beginning of the exhaust period, and second, prior to the ending of the exhaust period. In other words, the medium pressure air is cut off during a part of the scavenging period. The second time the medium pressure air cuts into the cylinder it remains on beyond the termination of the exhaust period.

The zone marked 7 shows the angle through which the low pressure scavenging air acts in the cylinder. It is seen that this air usually starts in the cylinder shortly after the exhaust has opened, and cuts off prior to the closing of the exhaust port. I may or may not overlap the flow of low pressure air from receiver 5, and the medium pressure air through valve M. In the diagram 7, I show them, however, slightly overlapping.

Fig. 8 A shows the engine with the piston approaching its lower position in the cylinder, with the exhaust ports, 11, open, and the low pressure scavenging port about to open, and the air under medium pressure entering the cylinder through port, 40, for superscavenging purposes.

Fig. 8 B shows the piston on its up stroke, with the low pressure scavenging port closed and the exhaust port, 11, closing. At this point, the engine cylinder is filled with air from the scavenging receiver, 5. In this position of the piston, the valve, M has again opened, and air under medium pressure against the poppet valve, 40, has forced air into the cylinder at a higher medium pressure than that of the scavenging receiver, 5, or that remaining in the cylinder, thereby charging the cylinder with air at a higher pressure than would otherwise be possible. This supercharging enables me to construct an engine of greater capacity for given piston displacement for the reason that it enables me later on in the cycle to inject a correspondingly greater amount of fuel into the cylinder, and to obtain thereby a correspondingly greater amount of heat influx produced by its combustion.

Fig. 8 C shows the position of the piston when the valves, M and H are both closed, the period of supercharging the cylinder has ceased, and the period of compression, solely by the piston, has begun.

Fig. 8 D shows the piston as it approaches the end of its up stroke. At this period, one of three conditions exists. In the first place, the air in the cylinder is compressed to a pressure below that in the equalizer, 37, in which case the valve, 53, does not open, or in the second place, the said air has been compressed to a pressure equivalent to that in the equalizer, 37, in which case the valve, 53, also does not open, or in the third place the said air has been compressed to a pressure exceeding that in the equalizer, 37, in which case the valve, 53, opens. As soon as the valve, 53, opens, as in this latter case, the pressures between the engine clearance, and the equalizer, 37 are equalized, but owing to the relative size of the equalizer, 37, as compared to the engine clearance, the pressure in the equalizer is but slightly affected thereby while on the other hand, the pressure in the engine clearance is limited to that of the equalizer, 37. The volume of the equalizer 37 is many times, for example twenty times, that of the cylinder clearance. Operating in this way, it is impossible for the pressure in the cylinder to exceed, at any time, that of the equalizer, 37, and as the latter can be fixed at a predetermined maximum, the pressure in the engine clearance can never exceed this predetermined maximum, whether in compression or in combustion, as explained hereafter. In this position, the fuel valve, 25, may begin to open for the injection of the fuel.

Fig. 8 E shows the piston at its extreme up position, with valve, M closed, and valve H has opened ports, 49, to the cylinder clearance, whereby the equalizer, 37, is directly communicated with the engine clearance,—the poppet valve, 53 is balanced and seated by its spring. The fuel valve 25 is open.

If the pressure in the cylinder clearance, 9, is less than that of the equalizer, 37, there will be a slight displacement of air from the equalizer to the engine clearance. If the pressure in the clearance, 9, equals that of the equalizer, 37, there will be no displacement of air through the valve, H, while if the pressure in the clearance, 9, is increased by combustion, above that of the equalizer, 37, there will be a slight displacement of air from the engine clearance to the equalizer, but in normal operation, the difference of pressures is so slight that no appreciable displacement of air takes place. The charge of air into the cylinder from the medium pressure receiver 34 together with residual air supplied from the receiver 5 are sufficient to support combustion; and the fuel injected into the cylinder at any instant is promptly burned by the immediately surrounding air. The charge of air in the receiver 37 accordingly remains substantially pure.

Fig. 8 F shows a piston in its downward travel, at the time when the valve H has just closed. This position of the piston also denotes the end of the combustion period, and the beginning of the expansion period, as well as approximately the point of cut off of both fuel and communication to the equalizer, 37, of the engine, also the point at which the pressure in the cylinder begins to drop below that of the equalizer. During the combustion period which is between the positions of the piston, as shown in 8E and 8F, there may be, in other types of internal combustion engines, oscillating or intermittent pressures set up in the cylinder clearance, due to unequal burning of the fuel, and which pressures may tend to rise appreciably above a desired maximum, and one feature of my invention, therefore, is to limit this rise in pressure, by stabilizing the pressure in the cylinder, at all times to a maximum of the pressure in the equalizer, 37. This improvement enables me to construct an engine with a minimum weight per horse power, at a given factor of safety, based on the predetermined maximum pressure. Manifestly, if my improvements were not incorporated in an engine of this type, it would be necessary to construct the engine to withstand much higher pressures than the useful working pressures of the engine, and obviously at considerable increased expense and without a known factor of safety. It must be appreciated that the oscillating or variable pressures of combustion in the cylinder are not fixed, known, or controllable, and it is impossible to design an internal combustion engine of this type, without my improvements, with any assurance that the factor of safety assumed will not be exceeded in operation.

Fig. 8 G shows the piston in its down stroke, during the expansion period.

At this point, it might be well to state that it is one of the purposes of my invention not to affect all of the air compressed in the valve clearances by the injection of the fuel, but to leave a certain amount of air trapped in these clearances, which will expand together with the gases of combustion, absorbing some of the heat of said gases, that otherwise would be lost, and thereby translating the same into mechanical work. This trapped air is also for the purpose of displacing, to a certain extent, the gases of combustion in the cylinder, to more thoroughly scavenge the same, at the time that the exhaust opens.

Fig. 8 H shows the position of the piston, just prior to the opening of the exhaust. In this position of the piston, I may start to introduce air through valve M under medium pressure, into the cylinder for super-scavenging purposes, similar to the method shown in Fig. 8 A, provided, however, the pressure in the cylinder is below that of the medium pressure receiver.

Fig. 8 I shows the position of the piston at the opening of the exhaust, after which the pressure of the gases in the cylinder causes the same to expand through the exhaust and the pure air above them to extend downwardly into the cylinder, preparatory to the introduction of the scavenging air from the low pressure receiver, 5, as described in connection with Fig. 8 A. At this time, the valve, M, may be already opened, as explained, in connection with Fig. 8H, thereby permitting air under medium pressure to enter the top of the cylinder, and the valve clearance, so that they can expand into the cylinder, as explained in connection with the position, 8G.

Having thus described my invention in detail, what I claim as new is:

1. The herein-described method of limiting the pressure in the cylinders of internal combustion engines to a predetermined maximum which consists in increasing the clearance of the cylinder by placing in communication therewith a body of substantially static gas when the pressure in the cylinder has reached substantially the predetermined maximum pressure.

2. The herein-described method of limiting the pressure in the cylinders of internal combustion engines to a predetermined maximum which consists in automatically increasing the clearance of the cylinder by placing in communication therewith a body of substantially static gas at substantially the maximum pressure when the pressure in the cylinder has reached substantially the predetermined maximum pressure.

3. The herein-described method of limiting the pressure in the cylinders of internal combustion engines which consists in placing in communication with the clearance of the cylinder when the pressure in the cylinder has reached substantially the predetermined maximum pressure a volume of substantially static air having substantially constant pressure substantially equal to the desired maximum pressure.

4. The herein-described method of limiting the pressure in the cylinders of internal combustion engines which consists in automatically placing in communication with the clearance of the cylinder when the pressure in the cylinder has reached substantially the maximum pressure a volume of air appreciably greater than that contained in said clearance, said air having a substantially constant pressure substantially equal to the predetermined maximum pressure.

5. The herein described method of operating internal combustion engines, which consists in charging the engine cylinder with all of the air needed for combustion, compressing said air in the cylinder to a predetermined maximum pressure, limiting the pressure of the air by communicating it with a separate body of air, at approximately the same maximum pressure, injecting fuel, burning the same, and ejecting the gases of combustion.

6. The herein described method of operating internal combustion engines, which consists in charging the engine cylinder with all of the air needed for combustion, compressing said air in the cylinder to a predetermined maximum pressure, injecting fuel, burning the same, limiting the combustion pressure in the cylinder by communicating its clearance space with a container, having a separate body of air at approximately the desired maximum pressure, and finally ejecting the gases of combustion.

7. The herein described method of operating internal combustion engines, which consists in charging the engine cylinder with all of the air needed for combustion, compressing said air to a predetermined maximum pressure, injecting fuel, burning the same, whereby oscillating pressures tend to set up in the cylinder, stabilizing said pressures, to a constant pressure, by communicating the clearance of the cylinder when the pressure therein has reached substantially the predetermined maximum pressure with a container having a separate body of air maintained at said constant pressure, and finally ejecting the gases of combustion.

8. The herein described method of operating internal combustion engines, which consists in charging the engine cylinder with all of the air needed for combustion, compressing said air in the cylinder, limiting said pressure to a predetermined maximum by cushioning the same against another body of air at substantially the same predetermined pressure.

9. The herein described method of operating internal combustion engines, which consists in charging the engine cylinder with all of the air needed for combustion, compressing said air in the cylinder, limiting said pressure to a predetermined maximum by cushioning the same against another body of air having a volume substantially larger than that of the engine clearance.

10. The herein described method of operating internal combustion engines, which consists in charging the engine cylinder with all of the air needed for combustion, compressing said air, limiting said pressure to a predetermined maximum pressure, by cushioning the same when its pressure has reached substantially the predetermined maximum pressure against another body of air having a normal static condition, at substantially the same predetermined pressure.

11. The herein described method of operating internal combustion engines, which consists in charging the engine cylinder with all of the air needed for combustion, compressing said air, limiting said pressure to a predetermined maximum pressure, by cushioning the same against another body of air having a normal static condition, at substantially the same predetermined pressure, beginning at the end of the compression stroke, and ending before the normal expansion begins in the cylinder.

12. The method of limiting the maximum pressure in an internal combustion engine cylinder during its combustion period, which consists in connecting to the cylinder, substantially at the end of the compression period, an air receiver charged with air at a substantially constant pressure equal to the predetermined compression pressure.

13. The method of limiting the maximum pressure in an internal combustion engine cylinder during its combustion period, which consists in connecting to the cylinder, substantially at the end of the compression period, an air receiver having a volume many times that of the cylinder clearance, previously charged with air at a substantially constant pressure equal to the predetermined maximum pressure.

14. The method of limiting the maximum pressure in an internal combustion engine during its combustion period, which consists in connecting to the cylinder substantially at the end of the compression period, and just prior to and during the time of fuel injection, an air-receiver, previously charged with air at a substantially constant pressure equal to the predetermined maximum pressure.

15. The method of limiting the maximum pressure in an internal combustion engine during its combustion period, which consists in connecting to the cylinder substantially at the end of the compression period, and just prior to, during and subsequent to the time of fuel injection, an air receiver, previously charged with air at a substantially constant pressure equal to the predetermined maximum pressure.

16. The method of limiting the maximum pressure in an internal combustion engine during its combustion period, which consists in connecting to the cylinder, for a period slightly longer than that of the time of combustion, a receiver charged with air maintained at a pressure substantially equal to the maximum predetermined compression pressure.

17. The method of limiting the maximum pressure in an internal combustion engine, which consists in connecting to the cylinder of the engine, substantially at the end of the compression stroke, and continuing to substantially the termination of the fuel cut off, an air receiver maintained constantly at the pressure of the predetermined maximum.

18. An internal combustion engine comprising a cylinder, a piston in the cylinder, an air receiver charged with air under pressure substantially that of the maximum normal pressure during the working stroke of the piston, and means adapted to connect the receiver to the cylinder at substantially the time in the travel of the piston during its compression stroke, when the pressure in the cylinder approximates that in the receiver.

19. An internal combustion engine comprising a cylinder, a piston in the cylinder, a receiver having a volume many times the volume of the cylinder clearance, charged with air under pressure substantially that of the maximum normal pressure in the cylinder during combustion, and means adapted to connect the receiver to the cylinder, timed by the movements of the piston.

20. An internal combustion engine comprising a cylinder, a piston in the cylinder, an air receiver charged with air at a predetermined safe maximum working engine pressure, and means adapted to connect the receiver to the cylinder at times in the cycle of the operations of the engine determined solely by the position of the piston in the cylinder.

21. An internal combustion engine comprising a cylinder, a piston in the cylinder, an air receiver charged with air at a predetermined safe maximum working engine pressure, and means adapted to connect the receiver to the cylinder at times in the cycle of the operations of the engine determined solely by the position of the piston in the cylinder, and not responsive to the pressure in the receiver.

22. An internal combustion engine comprising a cylinder, a piston in the cylinder, an air receiver charged with air at a predetermined safe maximum working engine pressure, and means adapted to connect the receiver to the cylinder at times in the cycle of the operations of the engine determined solely by the position of the piston in the cylinder, and not responsive to the pressure in the receiver, during the period of heat influx.

23. An internal combustion engine comprising a cylinder, a piston in the cylinder, an air receiver charged with air having a constant predetermined pressure, not altered by the normal working of the engine and a regulable timing means adapted to connect the receiver to the cylinder clearance, substantially during the combustion period.

24. The method of limiting the maximum pressure in the cylinder of an internal combustion engine, comprising cutting into the compressed content of the cylinder of a receiver of compressed air, constantly maintained under normal operations of the engine at said maximum pressure.

25. The method of limiting the maximum pressure in the cylinder of an internal combustion engine, comprising cutting into the compressed content of the cylinder of a receiver of compressed air, the air having many times the weight of the said compressed content, the pressure being constantly maintained under normal operations of the engine, at the said maximum pressure.

26. An internal combustion engine comprising a plurality of cylinders, a receiver common to all of the cylinders, charged with air under pressure equal to the predetermined maximum safe working pressure of the engine, a second receiver common to all the cylinders, charged with air at a lower pressure, and a single valve, driven by the engine, adapted to connect the high pressure receiver to the cylinder clearance, during the combustion period, and the lower pressure receiver during a part of the compression period of the cycle.

In testimony whereof, I hereunto affix my signature this fifteenth day of December, 1921.

WILLIAM B. SMITH WHALEY.

CERTIFICATE OF CORRECTION.

Patent No. 1,645,169.

Granted October 11, 1927, to

WILLIAM B. SMITH WHALEY.

It is hereby certified that error appears in the printed specification of the above numbered patent requiring correction as follows: Page 6, line 121, claim 12, after the article "the" insert the word "maximum"; and that the said Letters Patent should be read with this correction therein that the same may conform to the record of the case in the Patent Office.

Signed and sealed this 8th day of November, A. D. 1927.

Seal.

M. J. Moore,
Acting Commissioner of Patents.